(12) United States Patent
Goring et al.

(10) Patent No.: US 8,185,911 B2
(45) Date of Patent: *May 22, 2012

(54) SYSTEM AND METHOD FOR SIMPLIFICATION OF DATA STRUCTURE IN WIRELESS COMMUNICATIONS

(75) Inventors: Bryan Richard Goring, Wellesley (CA); David DeBruin, Guelph (CA); Viera Bibr, Kilbride (CA); Brindusa Fritsch, Los Altos, CA (US); Michael Shenfield, Richmond Hill (CA)

(73) Assignee: Research In Motion Limited, Waterloo (CA)

( * ) Notice: Subject to any disclaimer, the term of this patent is extended or adjusted under 35 U.S.C. 154(b) by 153 days.

This patent is subject to a terminal disclaimer.

(21) Appl. No.: 12/819,867

(22) Filed: Jun. 21, 2010

(65) Prior Publication Data
US 2011/0151848 A1    Jun. 23, 2011

Related U.S. Application Data

(63) Continuation of application No. 11/107,743, filed on Apr. 18, 2005, now Pat. No. 7,743,385.

(51) Int. Cl.
*G06F 9/46* (2006.01)
*G06F 15/16* (2006.01)

(52) U.S. Cl. ........................... 719/313; 709/203
(58) Field of Classification Search .................. None
See application file for complete search history.

(56) References Cited

U.S. PATENT DOCUMENTS

| | | | |
|---|---|---|---|
| 5,870,749 A | 2/1999 | Adusumilli | |
| 6,085,196 A | 7/2000 | Motoyama et al. | |
| 6,128,612 A | 10/2000 | Brereton et al. | |
| 6,321,337 B1* | 11/2001 | Reshef et al. | 726/14 |
| 7,082,433 B2 | 7/2006 | Anonsen et al. | |
| 2002/0156896 A1 | 10/2002 | Lin et al. | |
| 2002/0184213 A1 | 12/2002 | Lau et al. | |
| 2003/0055875 A1 | 3/2003 | Carter | |
| 2003/0129969 A1* | 7/2003 | Rucinski | 455/412 |
| 2004/0078424 A1 | 4/2004 | Yairi et al. | |
| 2004/0199614 A1 | 10/2004 | Shenfield et al. | |
| 2004/0267961 A1 | 12/2004 | Dietz et al. | |

(Continued)

FOREIGN PATENT DOCUMENTS

| | | |
|---|---|---|
| WO | 0219154 | 3/2002 |
| WO | 2004059939 | 7/2004 |

OTHER PUBLICATIONS

Abdou K. Seye, USPTO Office Communication dated Feb. 19, 2009 issued in relation to U.S. Appl. No. 11/107,743.

(Continued)

*Primary Examiner* — S. Sough
*Assistant Examiner* — Abdou Seye
(74) *Attorney, Agent, or Firm* — Novak Druce + Quigg LLP

(57) ABSTRACT

System and method for data simplification in wireless communications are enabled by an application developer toolkit used to convert complex service messages to a simplified data structure for storing information associated with a remote service that utilizes complex data structures for conveying the information to devices that access the remote service. The application developer toolkit also outputs maps for converting the complex service messages to simplified wireless messages in a format of the simplified data structure, and maps simplified wireless messages to complex service messages. A proxy located in a communications path between the wireless device and the remote service uses the maps to convert complex service messages to simplified service messages, and vice versa.

12 Claims, 6 Drawing Sheets

U.S. PATENT DOCUMENTS

2005/0114355 A1   5/2005   Nuttila

OTHER PUBLICATIONS

Abdou K Seye, USPTO Office Communication dated Jul. 13, 2009 issued in relation to U.S. Appl. No. 11/107,743.

Abdou K. Seye, USPTO Office Communication dated Oct. 15, 2009 issued in relation to U.S. Appl. No. 11/107,743.

Abdou K. Seye, USPTO Office Communication dated Feb. 8, 2010 issued in relation to U.S. Appl. No. 11/107,743.

* cited by examiner

SYSTEM AND METHOD FOR SIMPLIFICATION OF DATA STRUCTURE IN WIRELESS COMMUNICATIONS

CROSS-REFERENCE TO RELATED APPLICATIONS

This application is a continuation of application Ser. No. 11/107,743, filed Apr. 18, 2005, now U.S. Pat. No. 7,743,385 the contents of which are incorporated by reference hereinto.

MICROFICHE APPENDIX

Not Applicable.

TECHNICAL FIELD

This application relates generally to wireless communications and wireless communications devices and, in particular, to a method and apparatus for simplification of data structure in wireless communications.

BACKGROUND OF THE INVENTION

The acceptance of wireless devices as a preferred personal communications medium has created a growing demand for such devices. Users of such devices also increasingly expect more functionality and a broader range of services to be made available through such devices. Not only is there a demand for more functionality, there is also a demand for faster response times and more efficient access to remote services.

A major challenge is faced in exposing wireless devices to complex data sources, such as web services, due to the size and complexity of the data structures communicated from such sources. In wired networks and devices where resources and efficiency are not a significant concern, it is permissible to transmit, process and store large and complex data structures.

Complex data structures containing many levels of nesting introduce a significant memory overhead on wireless devices. This impacts performance when accessing such data in a memory store.

FIG. 1 is a block diagram of a prior art network in which wireless device users 10a, 10b operate wireless devices to send web service request messages via a public domain carrier 12 to an application gateway 14. The application gateway 14 forwards the web service request messages through the internet 16 to an appropriate web service 18a, 18b. The messages are processed by the appropriate web service 18a, 18b and returned through the internet 16 to the application gateway 14. The public domain carrier 12 forwards the response messages to the wireless device 10a, 10b which processes the response and displays response content to the wireless device users 10a, 10b.

FIG. 2 is a schematic diagram of an exemplary web service data structure 28 in accordance with the prior art. FIG. 2 schematically represents an exemplary complex data structure 20 named "GetSenatorInfoResponse". The complex data structure 20 contains a referring field 22 named "GetSenatorInfoResult" having a field type of "ArrayofSenatorInfo". The referring field 22 refers to a data component 24 that contains a single field "SenatorInfo" having a field type of array. Likewise, the referring field 26, refers to a candidate data component 28 "LocalAddress" having a field type of "ArrayofLocalAddress"). As will be appreciated by those skilled in the art, this complex data structure requires significant computing resources to store the structure in memory or retrieve it from memory at a rate that is acceptable to most users. Since wireless devices 10a, 10b also have limited available data transfer capacity commonly referred to as "bandwidth", they generally cannot send and receive complex data structures at a rate that is considered acceptable to most users.

Consequently, there exists a need for a system and method that provides data and message optimization in order to ensure that wireless device response time and wireless messaging efficiency can keep up with demand, and that wireless device users remain satisfied with the performance of their wireless devices.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The invention provides a system and method for simplification of data structures used in wireless devices that promotes efficient data storage, efficient data access and retrieval, and transparent, efficient wireless messaging between wireless devices and remote services, such as worldwide web services.

In accordance with a first aspect of the invention there is provided a system for simplification of data structure in wireless communications messages, comprising a developer toolkit comprising computer executable code for accepting as input a service message containing complex data structures with multiple levels of nesting and outputting a simplified service message which contains fewer levels of nesting, and further outputting a message map for transforming the simplified service message to the complex service message, and vice versa.

In accordance with a further aspect of the invention there is provided a method for simplification of wireless communications messages, comprising provisioning an application developer toolkit with computer executable code for accepting as input a service message having a complex data structure and outputting a simplified service message with a simpler data structure for communicating and storing information associated with a remote service that utilizes the service messages for communicating information to wireless devices that access the remote service.

The invention provides a system and method for the simplification of data structures used for wireless communications. Wireless devices are provisioned with user applications for accessing remote services, such as World Wide Web services. The user applications are conditioned to use a simplified data structure for storing information associated with a remote service that utilizes complex data structures for conveying the information to devices that access the remote service. An algorithm processes the complex data structures to simplify them by removing structure not utilized in the wireless device.

System Overview

Figure 3:
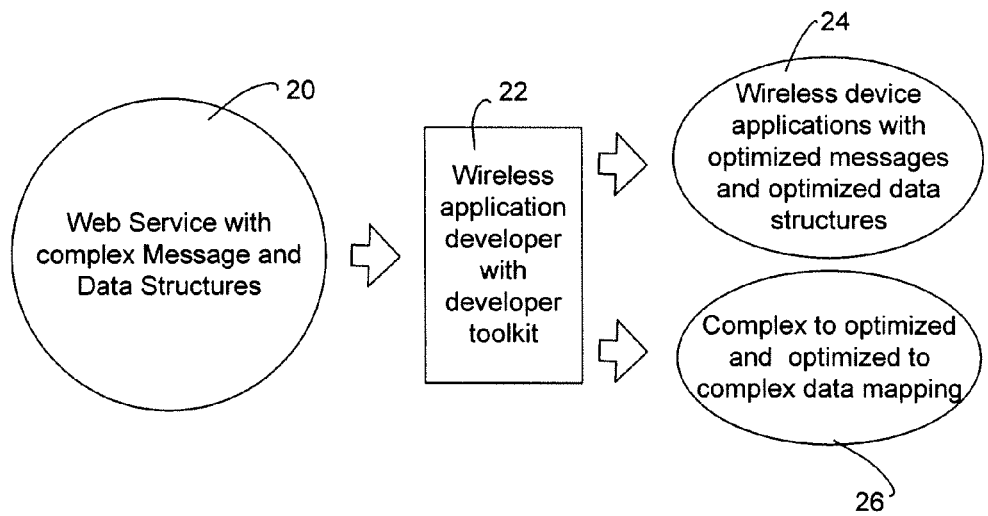
FIG. 3 is a schematic diagram illustrating a process for creating and enabling a system in accordance with the invention.

FIG. 3 is a schematic diagram illustrating a process for creating and enabling a system in accordance with the invention.

Figure 1:
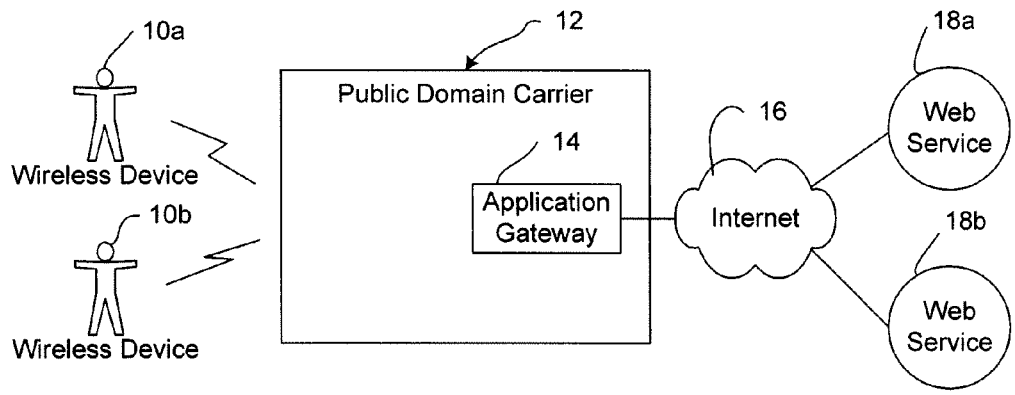
FIG. 1 is a block diagram of a prior art wireless network system.

A remote service accessed by the wireless devices 10a, 10b shown in FIG. 1, such as web service 20 uses complex message structures to communicate information to users who access the remote service. The web service 20 likewise uses complex data structures for data storage and data retrieval. A wireless application developer 22 uses a specification of the web service 20 and an application developer toolkit to create wireless device applications 24 and message maps 26 for enabling a system in accordance with the invention. The wireless device applications 24 with simplified message formats and simplified data structures is created from a specification for the web service 20. As will be explained below with reference to FIG. 7, the simplified data structures are created by "flattening" data structures defined in the web service specification. The process of flattening the web service data structures involves removing any unnecessary structure from the complex data structures, such as the exemplary data structure 20 shown in FIG. 2. The flattening of the complex data structures is performed by the application developer 22 using an automated or semi-automated algorithm, as will be explained below with reference to FIGS. 7 and 8.

After the simplified data structures and message mapping is created for converting complex service messages to simplified wireless messages. The message mapping 26 is used by a proxy at an edge of the wireless network to convert the complex service messages to simplified wireless messages before the simplified wireless messages are sent wirelessly to the wireless device users 10a, 10b. In one embodiment of the invention the proxy that applies the data mapping 26 is an application gateway, as will be explained below with reference to FIGS. 4 and 6.

Figure 4:
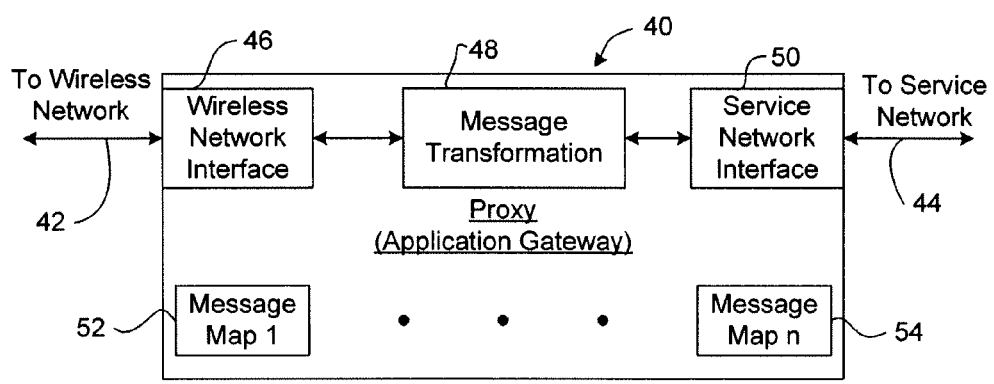
FIG. 4 is a block diagram of a proxy in accordance with the invention.

FIG. 4 is a block diagram of proxy 40 in accordance with the invention. The proxy 40 is located in a communications path between the wireless device 10a, 10b and the remote service, for example, a worldwide web service 18a, 18b. In one embodiment of the invention the proxy 40 is an application gateway, and is hereinafter referred to as the application gateway 40.

The application gateway 40 supports a wireless network interface 46 having a link 42 to the wireless network. A message transformation function 48 receives messages from the wireless network interface 46 and processes the messages before forwarding the messages to a service network interface 50. The service network interface 50 has a link to a service network 44 (the Internet, for example) over which it forwards the messages to an appropriate web service(s). In accordance with the invention, the application gateway 40 is provisioned with a plurality of message maps 52, 54. The message maps 52, 54 are created by the wireless application developer 22 and used by the message transformation function 48 to process service request and service response messages, as will be explained below in more detail with reference to FIG. 6. One message map 52, 54 is created by the application developer 22 for each message type used by each web service 18a, 18b.

Figure 5:
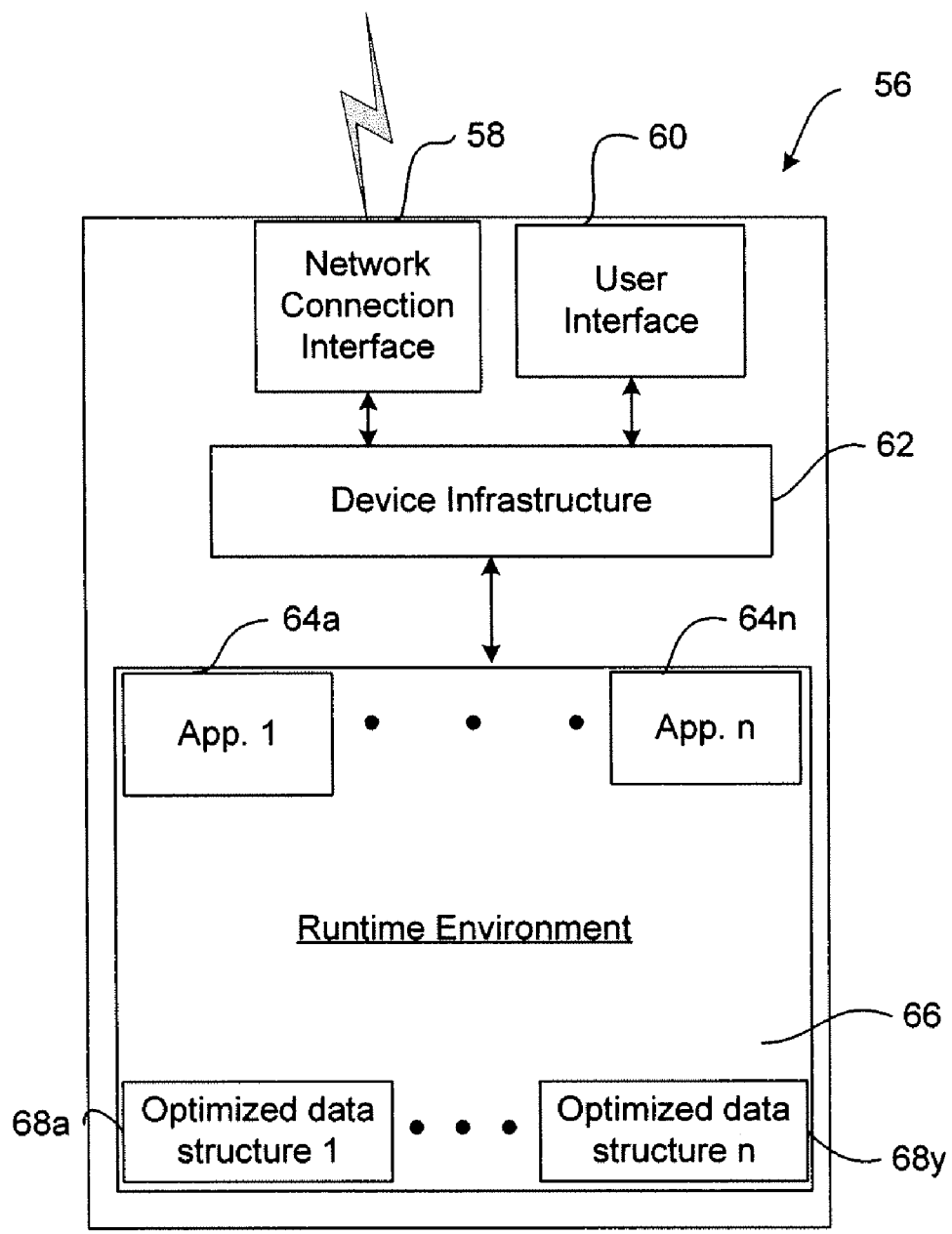
FIG. 5 is a block diagram of a wireless device in accordance with the invention.

FIG. 5 is a block diagram of a wireless device 56 in accordance with the invention. The wireless device 56 includes a network connection interface 58 that is well known in the art and used to communicate wirelessly with the public domain carrier 12. The wireless device 56 further includes a user interface 60, which may be a keypad, a touch sensitive screen, voice recognition software, or any other user interface for wireless devices. A device infrastructure 62 includes memory, processor(s), peripheral ports, keypad, display and other hardware components required to support the functionality of the wireless device 56. A run time environment 66 supports a plurality of simplified (optimized) data structures 68a, 68n that store corresponding application data in the simplified data structures, such as a simplified data structure 300, which will be explained below with reference to FIG. 8.

Operation Overview

Figure 6:
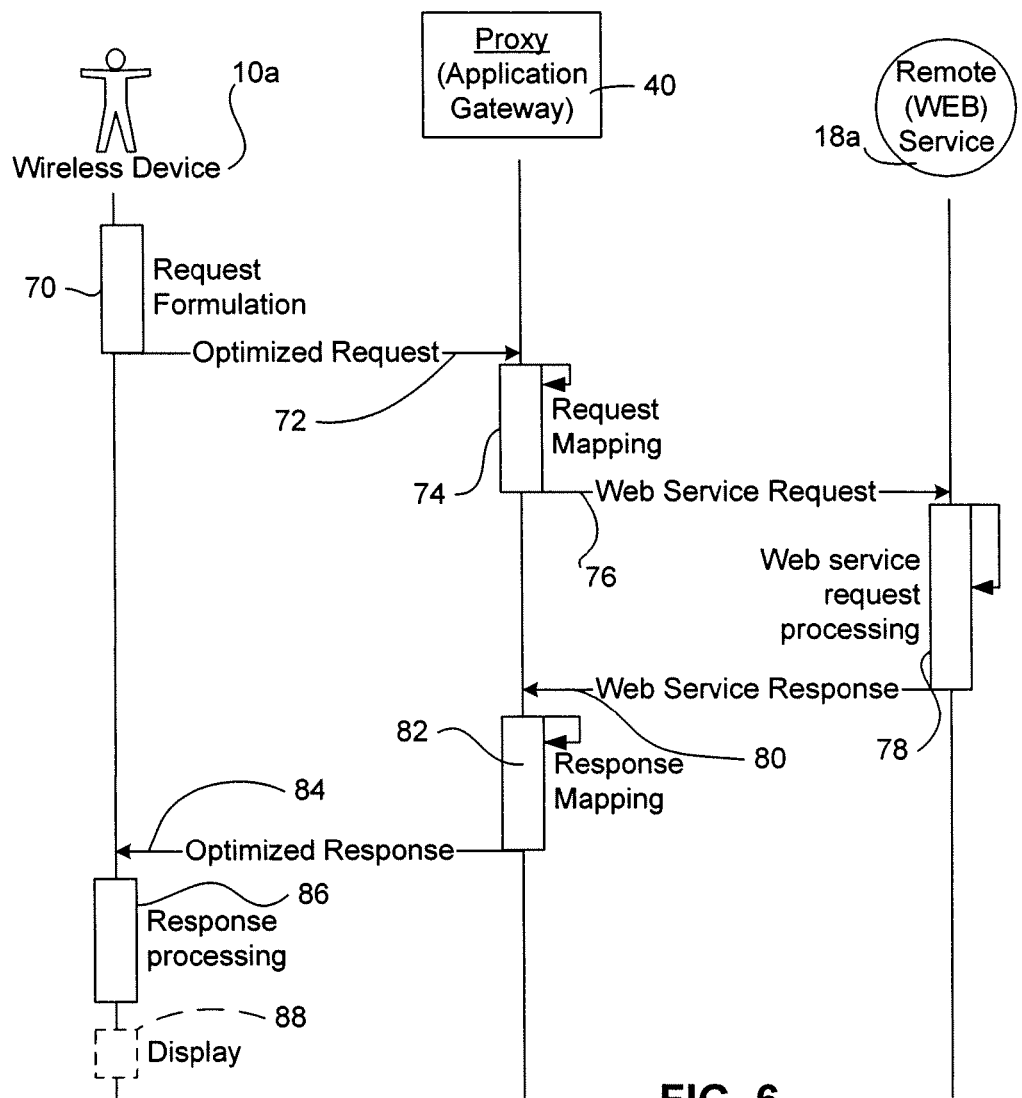
FIG. 6 is a high level overview of messaging between a wireless device and a remote service in a system in accordance with the invention.

FIG. 6 provides an overview of wireless messaging using simplified data structures in accordance with the invention. In step 70 a wireless device 10a formulates a service request message in a simplified format when a user of the wireless device 10a requests a service from web service 18a. The service request message is forwarded to the application gateway (step 72) which performs service request message mapping in step 74 to transform the service request message in the simplified format into a web service request message format required by the web service 18a. The application gateway 40 forwards the web service request message to the web service 18a (step 76), which receives the web service request message and processes the message in a manner well known in the art (step 78). The web service 18a then formulates and returns a web service response message (step 80). The application gateway 40 receives the web service response message, correlates the web service response message with the web service request message sent earlier, and performs web service response message mapping in step 82 to transform the web service response message to a response message in the simplified format used by the wireless device 10a. The application gateway 40 forwards the response message in the simplified format to the wireless device 10a in step 84. The wireless device 10a receives the service response message and performs service response message processing in step 86. The wireless device 10a may generate a display of information to the user in step 88, depending on a content of the service response message processed in step 86.

Data Structure Simplification

Figure 7:
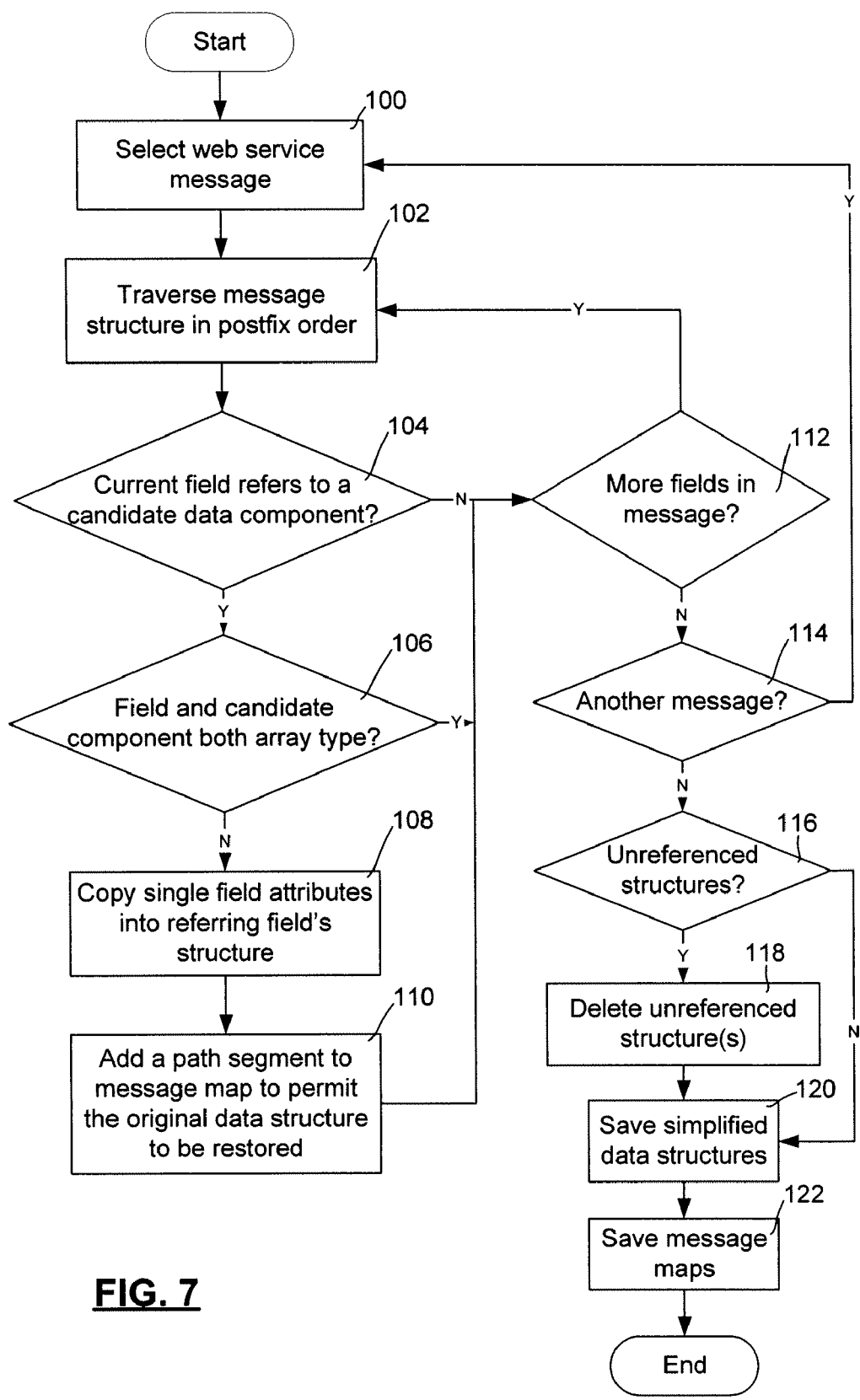
FIG. 7 is a flow chart of an algorithm in accordance with the invention for flattening complex data structures.

FIG. 7 is a flow chart of an algorithm in accordance with the invention embodied in computer executable code for simplifying complex data structures by "flattening" the data structures. This is a post-mapping process in which general message mapping is performed in a manner that is not within the scope of the instant invention.

The algorithm shown in FIG. 7 is, for example, a part of the application developer toolkit 22 (FIG. 3). The algorithm accepts complex web service messages as input and outputs a simplified service message for wireless messaging and a message map that permits the complex web service message to be reconstructed using the simplified service message and the message map.

Figure 2:
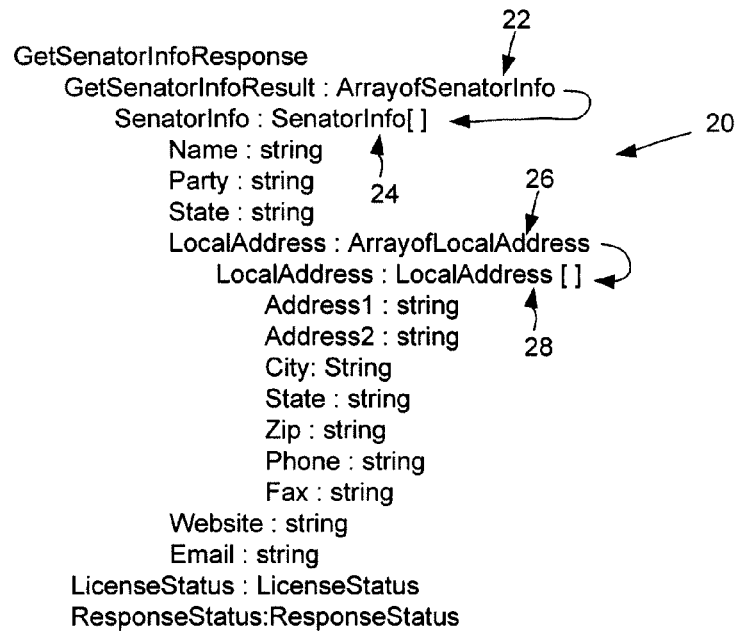
FIG. 2 is a schematic diagram of an exemplary prior art web service data structure.

As shown in FIG. 7, a web service message is selected in step 100. The selected message is, for example, a web service message that contains a complex data structure as shown in FIG. 2 with several levels of nesting that tax the resources of wireless transmission systems, as well as the limited processing power and storage memory of wireless devices 10a, 10b. The selected message is traversed in postfix order and each field of the message is examined (step 102). It is determined in step 104 whether a current field being examined refers to a candidate data component that permits the message to be flattened. A field that refers to a data structure that contains only a single field is a candidate data component. If the current field does not refer to a candidate data component, the algorithm checks to determine whether there are more fields in the message (step 112) and, if so, the algorithm returns to step 102. In step 106 it is determined whether the referring field and candidate data component are both of the array type. If both the referring field and the candidate data component are of the array type, the algorithm branches to step 112, and continues as described above.

However, if both the referring field and the candidate data component are not of the array type, the algorithm copies field attributes of the candidate data component up a level into the referring field's structure. A message map (FIG. 4) is then updated to add a path segment to identify the original location of the referring field (step 110). The algorithm then returns to step 112.

Figure 8:
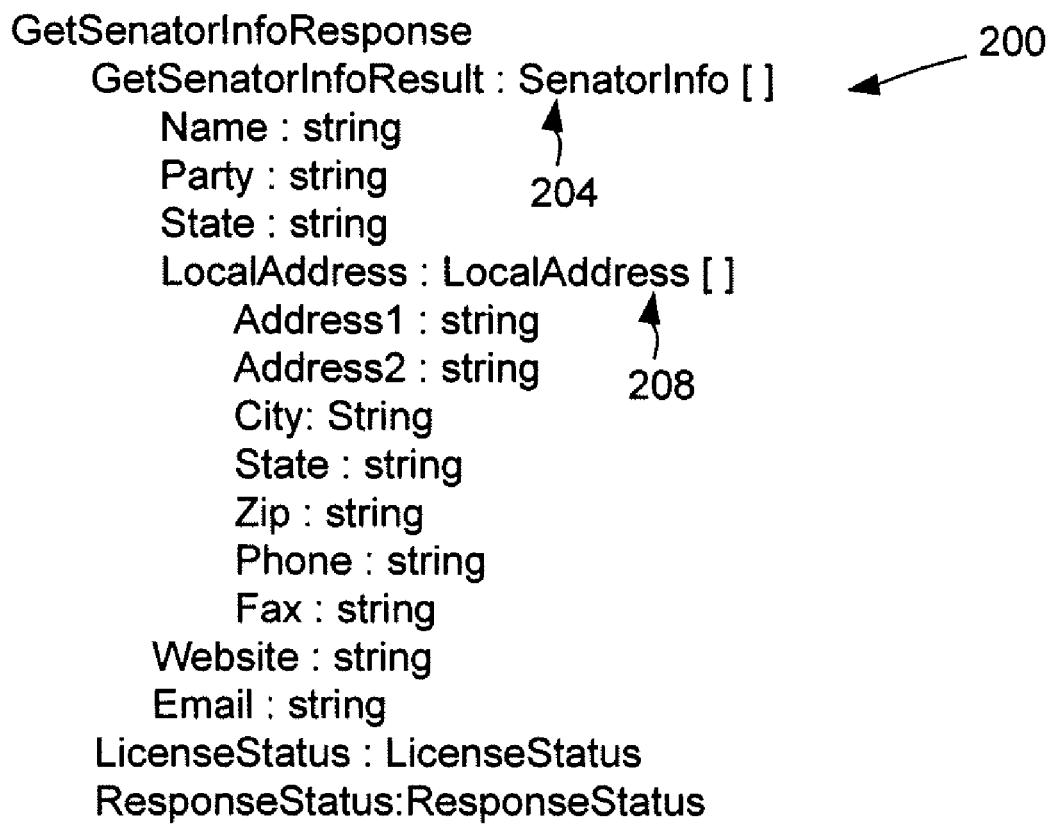
FIG. 8 is a schematic representation of the data structure shown in FIG. 2 after it has been flattened using the algorithm shown in FIG. 7.

When the entire message has been traversed in postfix order, it is determined in step 114 whether there is another message to process. If so, the algorithm returns to step 100. If not, the simplified (flattened) service messages are examined (step 116), to determine whether any of the simplified data structures are unreferenced in the data maps. For example, as shown in FIG. 8, and as will be explained below in detail with reference to FIG. 8, after flattening the GetSenatorInfoResult field 22 (FIG. 2) is changed to an array of SenatorInfo 204 (FIG. 8). If the type ArrayOfSenatorInfo is not referenced by any of the messages in a wireless application with which the messages are associated, then the algorithm deletes the unreferenced data structure (step 118). The same applies to the ArrayOfLocalAddress type 208 (FIG. 8). After any unreferenced data structure(s) are deleted, the remaining simplified data structures are saved (step 120). All modified message maps are then saved (step 122), and the message flattening algorithm terminates.

FIG. 8 illustrates the effects of employing the algorithm shown in FIG. 7 for simplifying, i.e. flattening, a web service message that contains the complex data structure shown in FIG. 2.

FIG. 8 schematically illustrates the complex data structure 20 shown in FIG. 2 after it has been simplified by flattening. The simplified data structure 200 does not contain the referring fields "GetSenatorInfoResult" 22 or "LocalAddress" 26. Rather, the field "GetSenatorInfoResult" 204 and "LocalAddress" 206 are respectively copied up into the position formally occupied by the respective referring fields 22, 26. With that exception, the simplified data structure shown in FIG. 8 is the same as the complex data structure shown in FIG. 7. Of course, as will be understood by those skilled in the art, for simplicity of illustration the exemplary data structures shown in FIGS. 2 and 8 are not necessarily representative of the complexity of data structures used by web services 18a, 18b.

As will be appreciated by those skilled in the art, the invention allows application developers to improve wireless device performance by reducing data processing overheads. It also allows application developers to reduce storage space requirements on the wireless devices 10a, 10b by reducing space-consuming complex data structures. The present invention also allows application developers to reduce bandwidth usage in the wireless leg of messaging required for accessing remote services, such as worldwide web services, while providing message maps for transparently delivering messages to the remote services in a native format that includes the complex data structures expected by the remote services.

Although the invention has been explained with explicit reference to web services, those skilled in the art will appreciate that the invention can be used to efficiently access any remote service that uses complex data structures for request/response messaging.

The embodiment(s) of the invention described above is(are) intended to be exemplary only. The scope of the invention is therefore intended to be limited solely by the scope of the appended claims.

We claim:

1. A non-transitory computer-readable medium storing computer executable code for effecting a developer toolkit for facilitating simplification of data structure in wireless communications messages, said computer executable code, when executed by a processor of a computing device, causing said computing device to:
   accept as input a complex service message containing a complex data structure with multiple levels of nesting;
   remove at least one field of said complex data structure to form a simplified data structure with fewer levels of nesting; and
   output a message map for transforming the simplified service message to the complex service message, and vice versa,
   wherein said removing of said at least one field comprises traversing the complex service message in postfix order and, for a current field encountered in the postfix order traverse: upon determining that the current field refers to a candidate data component containing a single field, copying single field attributes of the candidate data component to a position occupied by the current field if only one of the current field and the candidate data component are of an array type,
   and wherein said outputting of said message map comprises adding, to said message map, a path segment identifying an original location of said removed at least one field for use in said transforming of said simplified service message to said complex service message.

2. The computer-readable medium of claim 1 wherein the computer executable code further causes said computing device to determine whether more fields remain to be examined in the postfix traverse.

3. The computer-readable medium of claim 2 wherein the computer executable code causes said computing device to save the simplified service message after the complex service message has been examined.

4. The computer-readable medium of claim 3 wherein the computer executable code further causes said computing device to save the message map that permits the complex service message to be converted to the simplified service message, and vice versa.

5. The computer-readable medium of claim 1 wherein said computer executable code further causes said computing device to output said simplified service message which contains said simplified data structure with fewer levels of nesting.

6. The computer-readable medium of claim 5 wherein said computer executable code further causes said computing device to remove nesting structure from the complex service message to output the simplified service message.

7. A computing device in a system for simplification of data structure in wireless communications messages, said computing device comprising a processor and memory storing computer executable code for effecting a developer toolkit, said computer-executable code, when executed by said processor, causing said computing device to:
- accept as input a complex service message containing a complex data structure with multiple levels of nesting;
- remove at least one field of said complex data structure to form a simplified data structure with fewer levels of nesting; and
- output a message map for transforming the simplified service message to the complex service message, and vice versa,
- wherein said removing of said at least one field comprises traversing the complex service message in postfix order and, for a current field encountered in the postfix order traverse: upon determining that the current field refers to a candidate data component containing a single field, copying single field attributes of the candidate data component to a position occupied by the current field if only one of the current field and the candidate data component are of an array type,
- and wherein said outputting of said message map comprises adding, to said message map, a path segment identifying an original location of said removed at least one field for use in said transforming of said simplified service message to said complex service message.

8. The computing device of claim 7 wherein the computer executable code further causes said computing device to determine whether more fields remain to be examined in the postfix traverse.

9. The computing device of claim 8 wherein the computer executable code causes said computing device to save the simplified service message after the complex service message has been examined.

10. The computing device of claim 9 wherein the computer executable code further causes said computing device to save the message map that permits the complex service message to be converted to the simplified service message, and vice versa.

11. The computing device of claim 7 wherein said computer executable code further causes said computing device to output said simplified service message which contains said simplified data structure with fewer levels of nesting.

12. The computing device of claim 11 wherein said computer executable code further causes said computing device to remove nesting structure from the complex service message to output the simplified service message.

* * * * *